Sept. 14, 1937.  B. A. ADAMS  2,093,121
ADJUSTABLE FRAME FOR EYEGLASSES
Original Filed Sept. 19, 1933
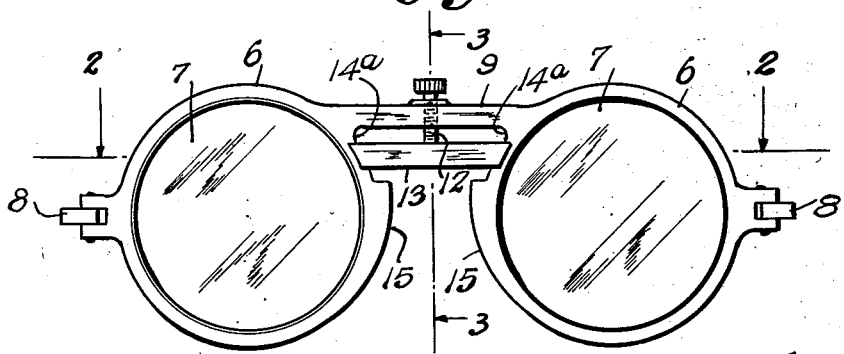
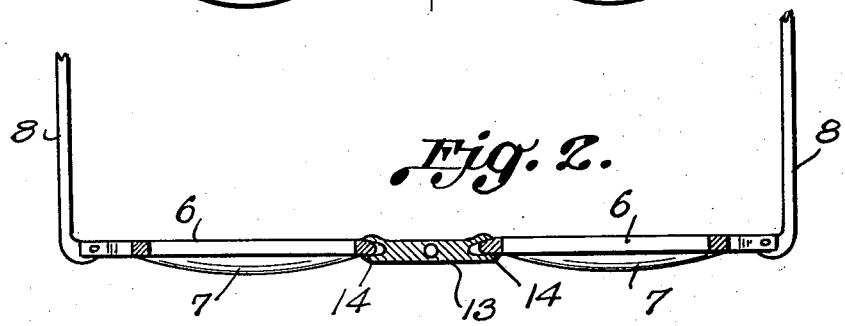
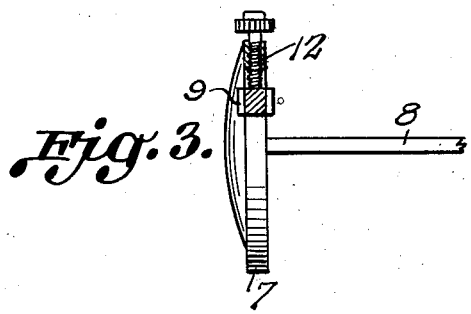
INVENTOR.
Burton G. Adams
BY
Harry C. Schroeder
ATTORNEY Patented Sept. 14, 1937

2,093,121

UNITED STATES PATENT OFFICE 2,093,121

ADJUSTABLE FRAME FOR EYEGLASSES

Burton A. Adams, San Leandro, Calif.

Substituted for application Serial No. 690,129, September 19, 1933. This application October 15, 1936, Serial No. 105,843

2 Claims. (Cl. 88—43)

This invention is a frame construction for eyeglasses or spectacles, so designed that the lenses may be quickly and selectively adjusted for near or far vision purposes.

It is common practice to construct eyeglasses and spectacles with so-called bi-focal lenses, one for distance vision and the other for close vision. However, the cause of many accidents has been traced to an inadvertent shift of the eyes of the wearer, as while going downstairs, so that the reading lenses are brought into alignment with the eyes, for instance, instead of the proper distance lenses. It is also a common practice for the wearers of bi-focal glasses to alternately shift the frame of the glasses while reading and talking, this being due to the eyes not adjusting themselves quickly enough to the change.

One of the objects of the invention is to provide means by which the frame of the glasses may be quickly adjusted by mechanical means, so that the proper lenses are available to the wearer when desired. A further and important object is to provide a frame so constructed and arranged as to permit ready accommodation, and to enable a person to select the lenses which he desires to be directly before the eyes, so that excessive movement of the eyes to accommodate themselves to the change is avoided.

In the accompanying drawing,

Figure 1 is a front elevation illustrating a spectacle frame constructed in accordance with the invention. Figure 2 is a longitudinal sectional view on the line 2—2, Figure 1. Figure 3 is a transverse sectional view on the line 3—3, Figure 1.

Referring to the drawing, 6, 6 designate the rims for the lenses 7, 7, bows 8, 8 being connected to the outer edge portions of the respective rims in a well known manner. A relatively high lens connecting member 9 is interposed between and fixedly connected to the rims at portions contiguous to the upper edges thereof. Each rim has its inner edge provided with a nose engaging portion 15, and between each nose portion and said lens-connecting member, the edge of each rim is provided with a guide portion 14$^a$. Rotatably and adjustably mounted in the lens-connecting member 9 is an adjusting screw 12, the lower end of which engages a bridge member 13 provided with forked ends 14 which straddle the respective guide portions 14$^a$, so that by rotative movements of said screw 12, the bridge member 13 may be adjusted upwardly or downwardly as desired, the bridge member being guided by reason of the forked portions 14 engaging the guide portions 14$^a$.

In use, the wearer of the glasses may quickly adjust them, the thread on the screw 12 having a considerable pitch, so that by rotating the screw a turn or two, the glasses are quickly shifted up or down, as the case may be. It is to be noted that the adjustment of the glasses does not in any way vary the general distance of the lenses from the eyes, when moving the glasses forwardly or rearwardly on the nose. In other words, the movement is only about the ears of the wearer because of the ear bows 8.

This case is a substitute for application Serial No. 690,129 filed September 19, 1933.

Having thus explained the nature of the invention and described an operative manner of constructing and using the same, although without attempting to set forth all of the forms in which it may be made, or all of the forms of its use, what is claimed is:—

1. An adjustable frame for eyeglasses comprising a pair of lens-supporting rims, a lens-connecting member interposed between and fixedly connected to the rims at positions contiguous to the upper edge portions thereof, each rim having its inner edge portion provided with a nose engaging portion and also with a guide portion interposed between the connecting member and the nose engaging portion, a bridge member located below the connecting member and having its ends slidably engaging the guide portions of the respective rims, and means carried by the connecting member for adjusting the bridge member relative thereto.

2. An adjustable frame for eyeglasses comprising a pair of lens-supporting rims, a lens-connecting member interposed between and fixedly connected to the rims at positions contiguous to the upper edge portions thereof, each rim having its inner edge portion provided with a nose engaging portion and also with a guide portion interposed between the connecting member and the nose engaging portion, a bridge member located below the connecting member and having forked end portions slidably engaging said guide portions, and an adjusting screw engaging said bridge and rotatably and adjustably mounted in said connecting member.

BURTON A. ADAMS.